United States Patent
Marakkannu et al.

(10) Patent No.: US 10,948,906 B2
(45) Date of Patent: Mar. 16, 2021

(54) MAINTENANCE PLAN FORECAST USING AUTOMATION CONTROL DEVICES' USAGE PATTERN THROUGH BIG DATA ANALYTICS

(71) Applicant: Honeywell International Inc., Morristown, NJ (US)

(72) Inventors: Sakthi Prakash Marakkannu, TamilNadu (IN); Vibgy Joseph, TamilNadu (IN); Balaji Bhathey Sivakumar, TamilNadu (IN)

(73) Assignee: Honeywell International Inc., Charlotte, NC (US)

( * ) Notice: Subject to any disclaimer, the term of this patent is extended or adjusted under 35 U.S.C. 154(b) by 291 days.

(21) Appl. No.: 14/730,952

(22) Filed: Jun. 4, 2015

(65) Prior Publication Data
US 2016/0357181 A1    Dec. 8, 2016

(51) Int. Cl.
| | |
|---|---|
| *G05B 23/02* | (2006.01) |
| *G08B 25/14* | (2006.01) |
| *G08B 29/02* | (2006.01) |
| *G08B 29/00* | (2006.01) |
| *G08B 29/18* | (2006.01) |

(52) U.S. Cl.
CPC ......... *G05B 23/0283* (2013.01); *G08B 25/14* (2013.01); *G08B 29/02* (2013.01); *G08B 29/00* (2013.01); *G08B 29/18* (2013.01)

(58) Field of Classification Search
CPC .... G05B 23/0283; G08B 25/14; G08B 29/02; G08B 29/18; Y10T 137/6161; F23H 2900/17002
USPC .......................................................... 700/79
See application file for complete search history.

(56) References Cited

U.S. PATENT DOCUMENTS

| | | | | |
|---|---|---|---|---|
| 5,729,474 A | * | 3/1998 | Hildebrand | ........ G05D 23/1917 700/276 |
| 6,346,889 B1 | * | 2/2002 | Moss | ...................... E05F 15/79 340/545.1 |
| 6,646,564 B1 | | 11/2003 | Azieres et al. | |
| 9,251,472 B1 | * | 2/2016 | Linowes | ................ G08B 19/00 |
| 9,679,253 B2 | * | 6/2017 | Gnocato | ................ G06N 7/005 |

(Continued)

FOREIGN PATENT DOCUMENTS

CN    101581907 A    11/2009

OTHER PUBLICATIONS

Extended European search report for corresponding EP patent application 16169816.2, dated Sep. 7, 2016.

(Continued)

*Primary Examiner* — Emilio J Saavedra
(74) *Attorney, Agent, or Firm* — Seager Tufte & Wickhem LLP

(57) ABSTRACT

A system including a wired or wireless automation device of an automation system that detects threats within a secured geographic area, a processor of the automation device that measures performance parameters of the automation device and reports the measured performance parameters to a control panel of the automation system and a processor of the control panel that compares the measured performance parameters of the automation device with one or more criteria, detects a potential failure of the automation device and presents recommendations for ameliorating the potential failure to an authorized human user of the automation system.

20 Claims, 5 Drawing Sheets

(56) References Cited

U.S. PATENT DOCUMENTS

| | | | |
|---|---|---|---|
| 2002/0113877 A1* | 8/2002 | Welch | B66B 27/00 348/148 |
| 2005/0200474 A1 | 9/2005 | Behnke | |
| 2007/0013941 A1* | 1/2007 | Anno | G06F 3/1214 358/1.15 |
| 2007/0024708 A1* | 2/2007 | Lin | H04N 7/181 348/143 |
| 2008/0168284 A1* | 7/2008 | Goodnow | H03K 19/00392 713/310 |
| 2009/0285586 A1* | 11/2009 | Kawaguchi | G03G 15/553 399/12 |
| 2010/0229735 A1* | 9/2010 | Deraas | B30B 15/32 100/42 |
| 2011/0050455 A1 | 3/2011 | Addy | |
| 2012/0076517 A1* | 3/2012 | Rapkin | G03G 15/55 399/24 |
| 2012/0095797 A1* | 4/2012 | Nishimura | G06F 21/6236 705/7.13 |
| 2012/0143498 A1* | 6/2012 | Zubas | G01C 21/32 701/438 |
| 2015/0178865 A1* | 6/2015 | Anderson | G05B 17/02 705/7.25 |
| 2015/0256597 A1* | 9/2015 | Gessner | G06Q 10/06 709/217 |

OTHER PUBLICATIONS

CN 201610542714.14, Third Office Action, pp. 12, dated Jun. 30, 2020.

* cited by examiner

MAINTENANCE PLAN FORECAST USING AUTOMATION CONTROL DEVICES' USAGE PATTERN THROUGH BIG DATA ANALYTICS

FIELD

This application relates to security systems and more particular to maintaining such systems.

BACKGROUND

Home or building automation systems that serve and protect people and assets within secured areas (e.g., a home or other residence, commercial area, etc.) are known. Such systems are typically based upon the use of one or more controlled devices and may include one or more sensors that detect threats within the area.

Threats to people and assets may originate from any of number of different sources. For example, a fire may kill or injure occupants who have become trapped by a fire in a home or a commercial building. Similarly, carbon monoxide from a fire may kill people in their sleep.

Alternatively, an unauthorized intruder, such as a burglar, may present a threat to assets within the area. In the case of intruders, sensors may be placed in different areas based upon the respective uses of those areas. For example, if people are present during some portions of a normal day and not at other times, then sensors may be placed along a periphery of the space to provide protection while the space is occupied while additional sensors may be placed within an interior of the space and used when the space is not occupied.

In most cases, threat detectors are connected to a local control panel. In the event of a threat detected via one of the sensors, the control panel may sound a local audible alarm. The control panel may also send a signal to a central monitoring station.

In general, home or building automation system work well. However, it are sometimes difficult to anticipate problems in such systems and to troubleshoot those problems when they occur, especially where an unexpected fault occurs. Accordingly, a need exists for better methods and apparatus for troubleshooting such systems.

DETAILED DESCRIPTION

Figure 1:
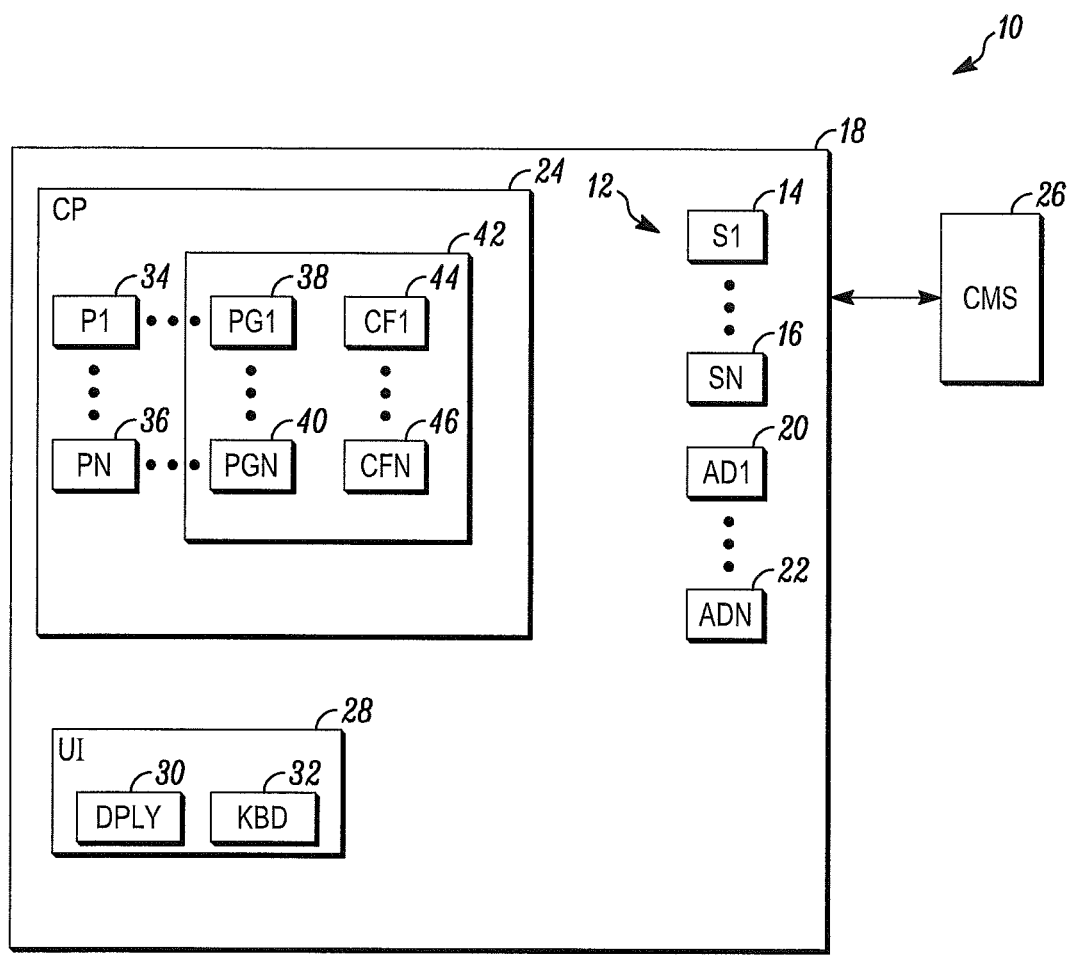
FIG. 1 illustrates a block diagram of a building automation system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

FIG. 1 is a block diagram of a home or building automation system 10 shown generally in accordance with an illustrated embodiment. Included within the building automation system are a number of building automation devices 12. For example, at least some of the building automation devices may be embodied as sensors or imaging devices 14, 16 that detect threats within a secured geographic area 18. Other of the building automation devices may be embodied as access control devices that control access into or out of the secured area or may be environmental control devices that control the environment of the secured area.

The sensors may be embodied in any of a number of different forms. For example, at least some of the sensors may be switches or vibration sensors placed on the doors and windows along a periphery of the secured area. Other of the sensors may be passive infrared (PIR) sensors located in the interior of the secured area that detects intruders who have been able to circumvent the sensors along the periphery.

Alternatively, the sensors may include one or more environmental detectors that detect threats to the safety of human occupants. For example, some of the detectors may be fire detectors while others may be toxic gas detectors.

The building automation devices may include one or more imaging devices. For example, one or more cameras may capture images within the secured area. A digital video recorder (DVR) may record those images on a continuous basis or only upon activation of an intrusion sensor.

A control panel 24 may be located within the secured area or elsewhere that monitors the sensors. Upon activation of one of the sensors, the control panel may send an alarm message to a central monitoring station 26. In response, the central monitoring station may respond by summoning help (e.g., fire department, police, etc.).

The access and environmental control devices may also be embodied in any of a number of different forms. For example, the access control devices may be card readers or automatic door controllers that mechanically open and close doors that provide access into and out of the secured area or portions thereof. Alternatively, the access control devices may be magnetic locks that lock or unlock those doors and that control the opening of those doors. Similarly, environmental control devices may control lighting, heating, ventilating, air conditioning (HVAC) units, etc. within the secured area.

A user interface 28 allows a human user to control the building automation system. For example, the user may enter a personal identification number (PIN) and function key through a keyboard 32 to arm security features provided by the building automation system. Status information (e.g., armed, disarmed, etc.) may be shown on a display 30.

Included within the control panel, the automation devices and user interface may be one or more processor apparatus (processors) 34, 36, each operating under control of one or more computer programs 38, 40 loaded from a non-transitory computer readable medium (memory) 42. As used herein, reference to a step of a computer program is also reference to the processor that executed that step.

For example, a status processor may monitor the keyboard for input from the user. Upon entry of a valid PIN by the user along with activation of an arm key, the status processor may cause a security system portion of the building automation system to enter an armed state. Similarly, the user may enter the appropriate codes to activate and deactivate various building automation devices such as heating ventilating air conditioning (HVAC) equipment, lighting or a home entertainment system.

Once the security system of the building automation device is armed, an alarm processor may monitor each of the sensors for threats. Upon activation of one of the sensors, the alarm processor may compose and send an alarm message to the central monitoring station.

In addition to monitoring for and reporting threats, the security system or a separate entry control system may monitor a set of card readers on the entrances and exits of the secured area. Upon the presentation of an ID card of an authorized person to a card reader, an entry control processor may compare an identifier read from the card with a set of identifiers of authorized users saved in the memory of the control panel. If a match is found, the entry control processor may activate a magnetic lock to unlock a corresponding door and activate a door opening device to automatically move the door to a fully open position. After a predetermined period of time sufficient for the user to enter, the entry control processor closes the door.

Under one illustrated embodiment, one or more device usage or tracking processors of a failure evaluation subsystem determines a set of performance parameters for each of the building automation devices. Based upon changes in the performance parameters, the tracking processor is able to detect performance degradation over time and the need for corrective action. Based upon the degradation over time, the tracking or a related processor may detect the possibility of a potential failure of the device and present recommendation for ameliorating the potential failure to an authorized human user of the automation system.

For example, the tracking processor may determine the duration of time necessary for a door opener to move a door from a fully closed to a fully open position and from a fully open to a fully closed position. The determined duration of time may be compared with a criteria found within a criteria file 44, 46 of the door opener. If the determined time exceeds the criteria, then the processor may retrieve a message that is presented through the display of the user interface. In this case, the message may include an identifier of the door opener, its location and an indicator that the door is opening too slow. The message may further give an indication of possible remedial actions such as greasing or cleaning the moving parts (e.g., the track) of the door opener.

In general, the criteria for identifying the need for remedial action may be based upon any of a number of different sources of information. Under one illustrated embodiment, the criteria file is based upon a set of operational specifications originally provided by a manufacturer of the device (e.g., the door opener). Under another embodiment, the criteria may be based upon measured parameters obtained when the device was originally installed.

In another example, consider an HVAC unit connected to and controlled by the building automation system. In this case, an outside temperature sensor may be used to detect or otherwise gauge the effectiveness of the HVAC unit in the time it takes to cool or heat the space under a specific set of conditions.

In general, the use of a tracking processor to track and detect the degradation of performance and to advise on ways of correcting the performance offers a number of advantages. For example, there is often a very large number of automation devices installed in some large premises. These devices/equipment wear out slowly and steadily depending on the usage. The maintenance of this equipment may be ignored by maintenance personnel or the operator due to the inherent human inability to perceive small changes over long periods of time.

On the other hand, identifying other devices of the building automation system that are not used to their full potential or capacity is a challenge that has also not been previously addressed in large premises. The usage of devices (e.g., doors, magnetic locks, status input devices, camera, PIR detectors, vibration sensors, DVRs, etc) over a period of time is not apparent to the operator. In addition, there is no apparent way of obtaining this information without a great deal of data analysis by the operator.

For example, consider a central door on an outside of a building that is highly used because it allows access to many other areas within the building. If it stops working unexpectedly, then this will result in a security threat to the entire building. This situation can be avoided if the door components are serviced based upon usage.

The system of FIG. 1 analyzes the key performance parameters of each device of various systems (e.g., access control, video, HVAC, lighting, etc.) from the recorded events. The system generates customized maintenance activities by matching the performance parameters with the equipment's warranty information and environmental measurements from the area in which the device is placed. Additional information can be derived from a Building Information Model (BIM) and weather feeds.

In the case of the door, the time elapsed between the energize or de-energize event and the door position sensor providing an open or closed signal gives the time the door takes to respond for opening and closing. This time interval is the performance parameter than can be monitored by the system for degradation.

The proposed system correlates contextual information (e.g., temperature) where equipment is deployed, etc. along with usage statistics to suggest specific maintenance tasks such as providing increased thermal insulation, frequent cleaning of devices placed outdoors, etc.

The system of FIG. 1 also detects nuisance alarms from analysis of alarm logs by a nuisance alarm processor over a period of time. In this case, the recommendation may be limited to a general statement that the repeated alarms indicate a potential failure of the sensor.

Figure 2:
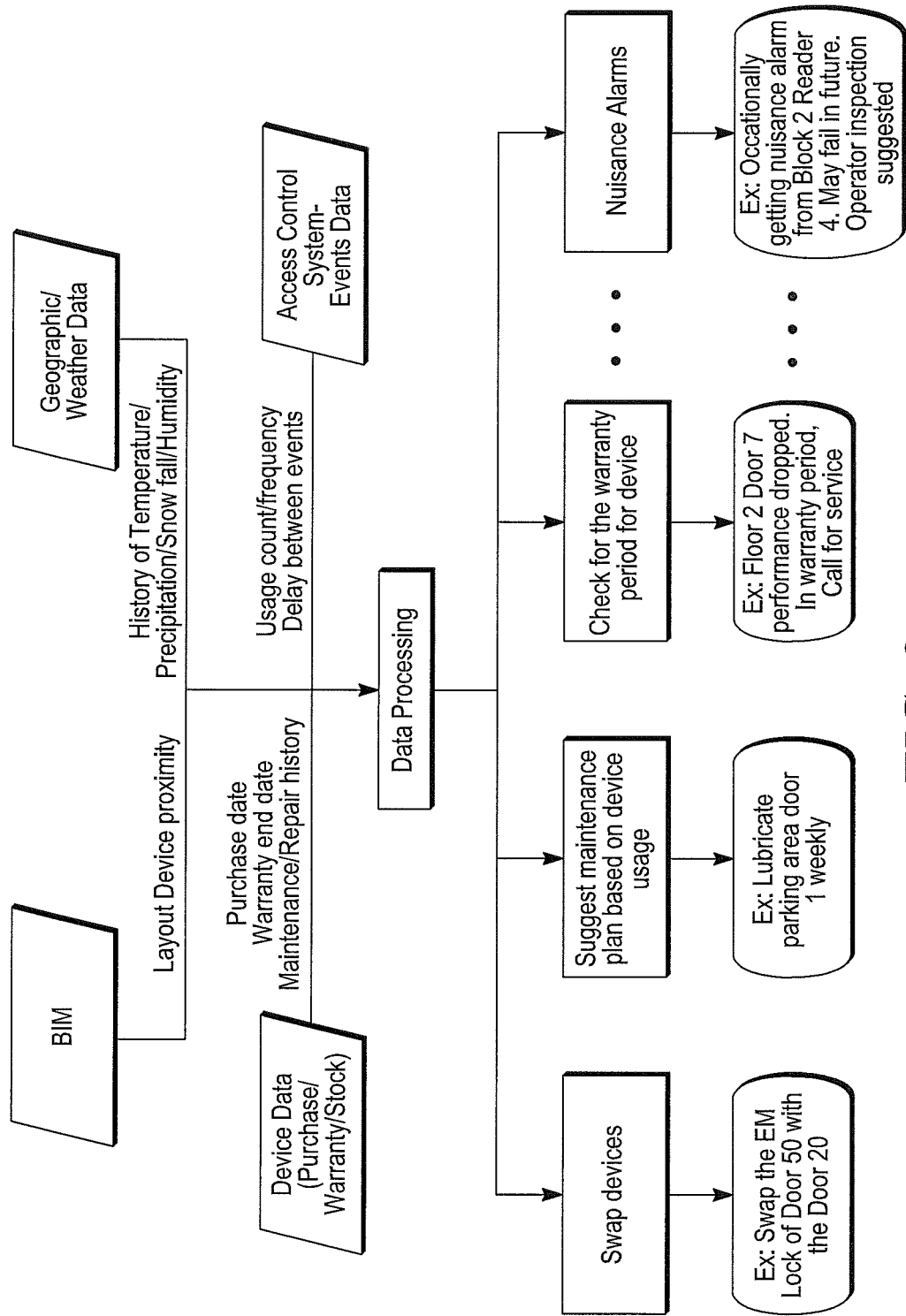
FIG. 2 is a block diagram of processing modules of the system of FIG. 1.

As illustrated in FIG. 2, the failure subsystem has a data processing unit which receives data from multiple sources (e.g., BIM, weather feeds, warranty information, security system, etc.). The data processing unit analyzes the data from the different sources and suggests different actions to the user. The failure system also contains a number of sub-processes such as a swap processor, warranty information processor, nuisance alarm processor, etc., that specifically look for pattern changes in different performance parameters and suggest appropriate maintenance actions.

The examples in the diagram of FIG. 2 are specifically set in the context of an access control system. However, these same concepts can be extended to devices in other system that include IT systems (e.g., storage devices, servers, etc.).

In addition, the failure system has a set of criteria that can be changed at the convenience of a system engineer. The system presents these performance parameters (i.e., criteria) to the system engineer who can then create his/her own rules and conditions for triggering custom maintenance actions.

The failure detection system has a number of advantages over conventional home or building automation systems. For example, the system reduces the reliance on the system engineer's ability to perceive the gradual degradation of the device over a long period of usage. By providing this level of analysis, the service engineer can analyze the problem in an intelligent way. The system helps the client to save money by using devices optimally by comparing device performance with manufacturer's specification and, where there is a difference, prompting to correct any deficiencies that cause the difference. By comparing the usage of the same type of devices within the premises, the reasons for differences in performance parameters can identified and used to better position the devices in order to ameliorate environmental effects thereby increasing the lifetime. By planning maintenance cycles based on real usage of devices, maintenance effectiveness increases and manual effort is reduced.

The failure detection system may be used in large industrial/commercial/residential buildings with large numbers of installed security devices. The system may reduce the cost of maintaining the large number of devices by providing optimum/efficient anticipatory maintenance plans. The system may compare the statistics of the same type of devices used for the same purpose among different brands to achieve an overall maintenance cost of each brand. The system may also compare the performances of different brands to arrive at the performance of devices from each brand, thereby helping the customer to identify the better brand for future purchases/investments. The system can also be used to generate an anticipatory maintenance plan for other devices such as cameras, PIRs, lighting systems, DVRs and projectors based on the data analysis to achieve similar benefits.

Based upon the analysis of recorded events, the system identifies the least and most used equipment such as doors, readers or cameras. This may be overlaid in a graphical format over a map of the secured area based upon BIM information.

The system suggests a method of increasing the service warranties of devices based upon usage by providing a better operating environment for the device. The system also provides a basis for intimating a service/replacement plan based upon average maintenance time/costs.

Figure 3:
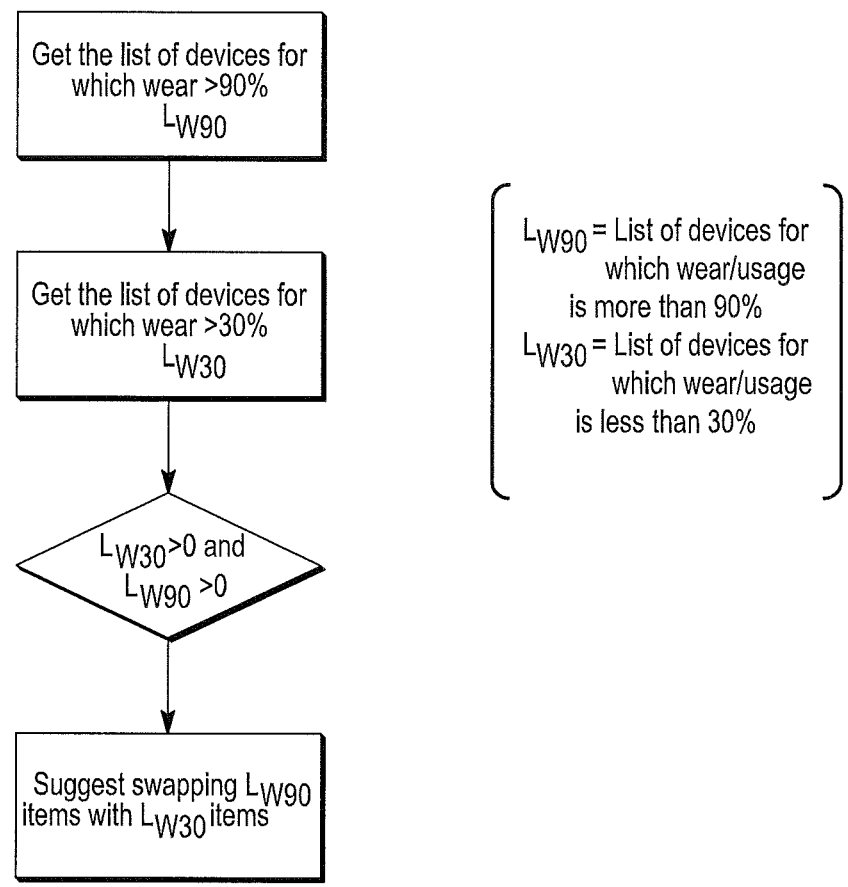
FIG. 3 is a block diagram of a swapping module of the system of FIG. 1.

The system also provides a processor that suggests swapping of devices, if one of the devices fails or if some of the devices are underutilized. For example (see FIG. 3), the system will extract a list of devices for which the wear or usage has crossed the 90% of its manufacture specified limit. Then, it will extract a list of similar type of devices which has a wear or usage below 30% of its manufacturer specified limit. From both lists, the system will suggest swapping the most used devices with the least used devices. This can prolong the life of devices.

In many prior systems, an operator is often accustomed to ignoring random trouble events from working devices. However, those same devices may fail over a period of time because of the negligence of ignored warnings which could otherwise have been analyzed from the recorded event data.

Consider a door with a "door held open" time of 10 seconds after a valid card has been read by an associated card reader. However, after some months the "door held open" becomes 15 seconds. Here the normal behavior has deteriorated over time based on usage. This will be detected by the failure detection system early enough so that the door can be serviced before it fails completely.

The failure detection system may also compare the rate of wear for devices of two different brands in similar usage and environment. If one brand's device wears faster than the other, then the proposed system suggests using the better brand.

Figure 4:
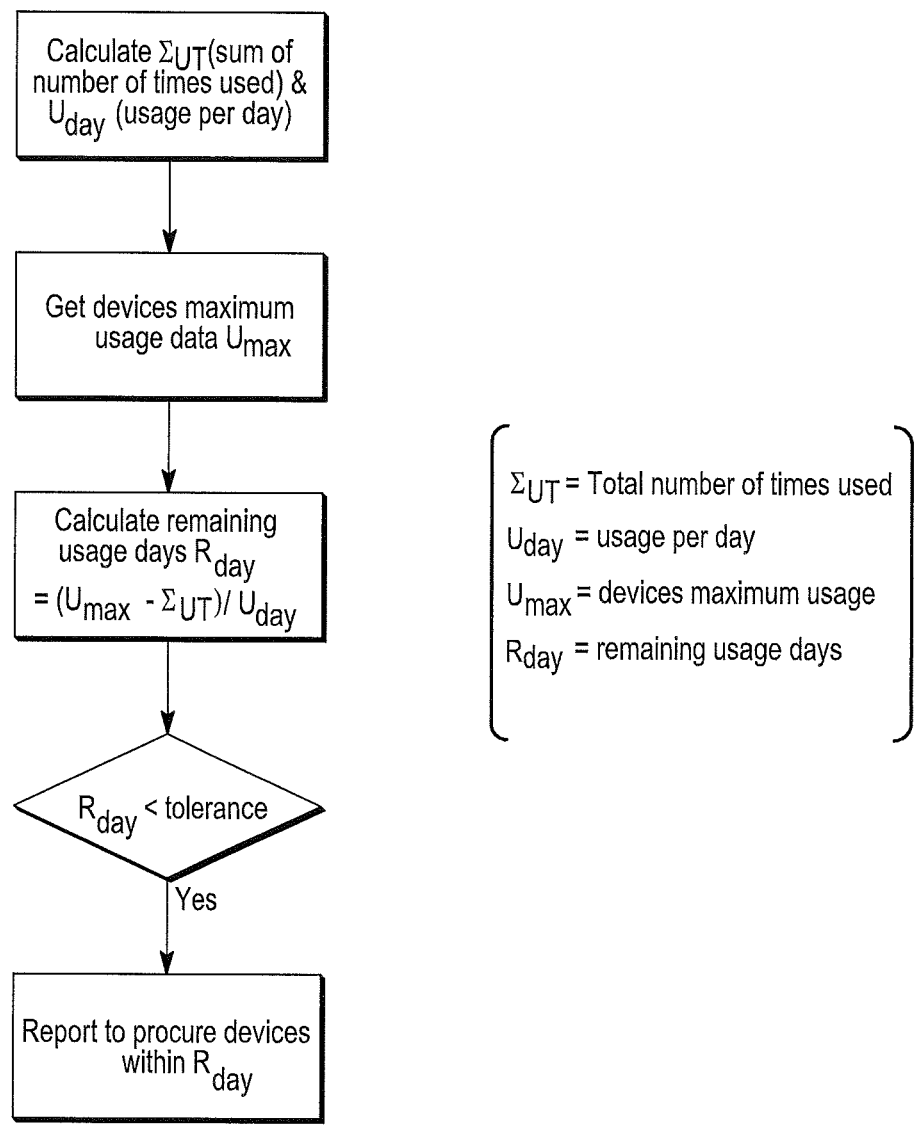
FIG. 4 is a block diagram of an end-of-life processing module of the system of FIG. 1.

The failure detection system may calculate the rate of wear of devices and forecast when the total usage nears the manufacturer's defined lifetime limit for the device. The system reports the list of devices reaching their limit in the near future, which could be helpful for use for a procurement plan. For example (see FIG. 4), the system will calculate the total wear or usage of all of the devices and then will calculate the remaining usage based on the manufacturer specified limit. If the remaining wear or age expires within a pre-defined period of time, then the system will notify the operator to procure devices in advance.

The system will raise an alert if the device's performance falls below specified limits before the manufacture guaranteed time frame. This allows the device can be replaced well before the warranty period ends.

The system suggests using higher grade products (e.g., more rugged doors, higher strength materials, etc.) in places where high wear and tear is detected. This reduces costs by increasing the time between maintenance intervals.

The system suggests to manually check specific devices if they are used sparingly. This can reduce the future failures due to negligence or undetected deterioration due to non-use.

The system can track the total time a PIR sensor or vibration sensor is/was kept armed. This can be used to suggest a more frequent check on battery life of these sensors.

The system can detect that devices like projectors and lighting systems are being used heavily in one area of a building and are scarcely used in another area. This could be used to suggest swapping these devices to extend the device's lifetime.

The system can monitor top level parameters like camera frame rate, DVR hard disk space utilization. This information can be used to suggest corrective actions or configuration changes for increasing the device life time without compromising the desired functionality.

Figure 5:
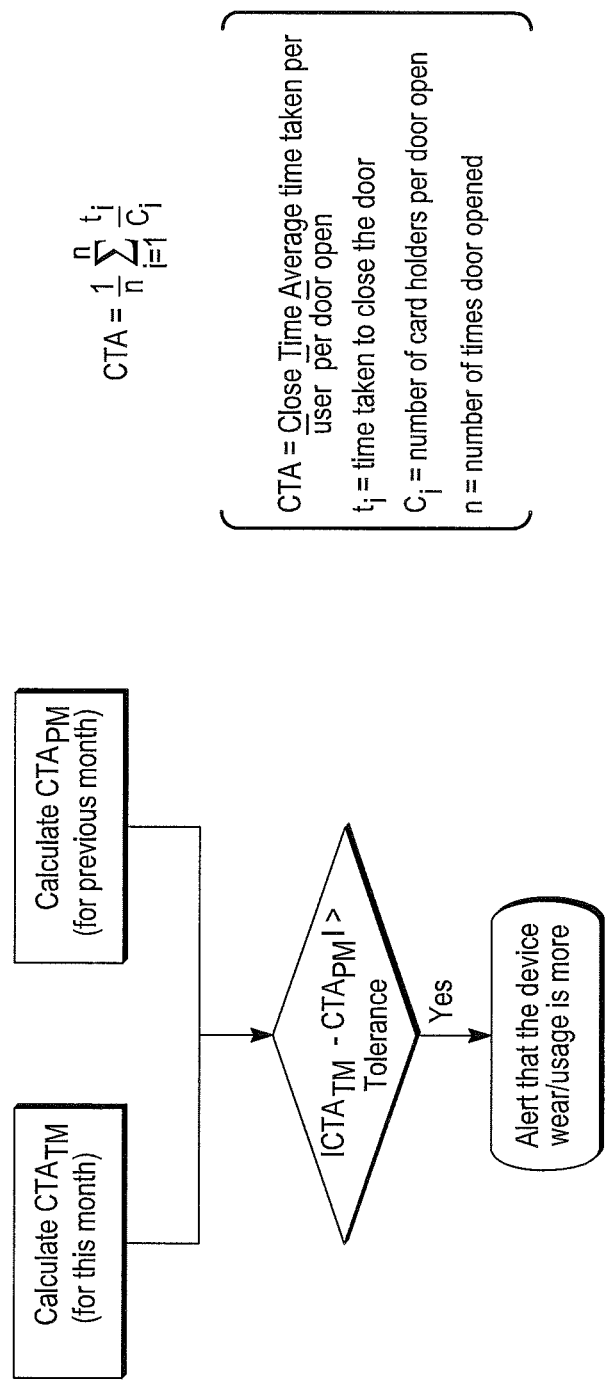
FIG. 5 is a block diagram of an alerting module for sudden wear.

If there is a sudden increase or decrease in wear or usage, the system detects the change. The system then compares the current month's data with that of the previous months and notifies the user that there has been a sudden change in usage for that particular device (see FIG. 5).

In general, the system includes a wired or wireless automation device of an automation system that detects threats within a secured geographic area, a processor of the automation device that measures performance parameters of the automation device and reports the measured performance parameters to a control panel of the automation system and a processor of the control panel that compares the measured performance parameters of the automation device with one or more criteria, detects a potential failure of the automation device and presents recommendations for ameliorating the potential failure to an authorized human user of the automation system.

Alternatively, the system includes a plurality of wired or wireless automation devices located within a secured geographic area at least some of which detect threats within the secured geographic area, an automation system that monitors at least some wired or wireless automation devices for threats within the secured area and reports detected threats to a central monitoring station, a processor of the automation device that measures performance parameters of the automation devices and reports the measured performance parameters to a control panel of the automation system and a processor of the control panel that compares the measured performance parameters of each of the automation devices with one or more criteria, detects a potential failure of the automation device and presents notices regarding the potential failure to an authorized human user of the automation system.

Alternatively, the system includes a plurality of sensor devices located that detect threats within the secured geographic area, at least one wired or wireless automation device that controls access to the secured geographic area, an automation system that monitors the sensor devices for threats within the secured area and reports detected threats to a central monitoring station, a processor of the automation device that measures performance parameters of the at least one automation device and reports the measured performance parameters to a control panel of the automation system and a processor of the control panel that compares the measured performance parameters of the automation devices with an operating specification of the at least one automation device, detects a potential failure of the automation device and presents a notice regarding the potential failure to an authorized human user of the automation system.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A system comprising:
   a first device of a building automation system installed at a first location within a building, wherein the first device comprises one of a building security device, a building HVAC (Heating, Ventilation and/or Air Conditioning) device, and a building lighting device;
   a processor of the first device measures one or more performance parameters of the first device and reports the one or more performance parameters to a control panel of the system; and
   a processor of the control panel tracks changes in the one or more performance parameters over a period of time against one or more criteria to detect a degradation rate of the one or more performance parameters over the period of time, including a measure of wear of the first device,
   wherein the processor of the control panel forecasts a potential failure of the first device based on the degradation rate, determines a need for corrective action to prevent the potential failure, and presents one or more recommendations for the corrective action sufficient to prevent the potential failure,
   wherein the processor of the control panel identifies a second device of the system, the second device installed at a second location within the building, different from the first location, and
   wherein, the processor of the control panel determines the need for the corrective action to prevent the potential failure of the first device by at least determining that the wear of the first device exceeds a first threshold, the processor of the control panel suggests, in the one or more recommendations, installing the second device at the first location within the building in place of the first device when the wear of the second device is below a second threshold, wherein the first threshold is greater than the second threshold, and suggests installing the first device at the second location within the building in place of the second device.

2. The system as in claim 1 wherein the one or more criteria include technical specifications of the first device.

3. The system as in claim 2 wherein the performance parameters include an environmental parameter of the first device.

4. The system as in claim 3 wherein the environmental parameter includes one of temperature, air quality, and humidity.

5. The system as in claim 4 wherein the one or more recommendations include a message suggesting an addition of insulation to the first device to avoid operation of the first device outside of the technical specifications.

6. The system as in claim 1 wherein the first device is a building security device and includes one of a door opener, a magnetic lock, a status input device, a camera, a passive infrared detector, a vibration sensor, and a digital video recorder.

7. The system as in claim 1 wherein the first device includes an opener for a door and the performance parameters include one of an opening time and a closing time of the door.

8. The system as in claim 7 wherein the one or more recommendations include a service recommendation that the door be serviced immediately.

9. A system comprising:
   a plurality of security devices located within a secured area, each of the plurality of security devices installed at a particular location within the secured area;
   an automation system that monitors the plurality of security devices for threats within the secured area and reports the threats to a central monitoring station;
   a respective processor of each of the plurality of security devices that measures respective performance parameters of a respective one of the plurality of security devices and reports the respective performance parameters of respective one of the plurality of security devices to a control panel of the automation system; and
   a processor of the control panel that tracks respective changes in the respective performance parameters of each of the plurality of security devices over a period of time against one or more criteria to detect a respective degradation rate of the respective performance parameters of each of the plurality of security devices over the period of time, including a measure of wear for at least some of the plurality of security devices,
   wherein the processor of the control panel forecasts a potential failure of a first group of the plurality of security devices based on the respective degradation rate of the respective performance parameters of each of the first group of the plurality of security devices, determines a need for a respective corrective action to prevent the respective potential failure of each of the first group of the plurality of security devices, and presents a notice regarding the potential failure of each of the first group of the plurality of security devices,
   wherein the processor of the control panel identifies a second group of the plurality of security devices, each of the second group of the plurality of security devices elsewhere within the secured area, and
   wherein, the processor of the control panel determines the need for the respective corrective action to prevent the potential failure of each of the first group of the plurality of security devices by at least determining that the wear of the corresponding security device exceeds a first threshold, the processor of the control panel suggests, in the notice, installing each of the second group of the plurality of security devices in place of a corresponding one of each of the first group of the plurality of security devices at the respective locations within the secured area of each of the first group of the plurality of security devices wherein the wear of the second group of the plurality of security devices is below a second threshold and wherein the first threshold is greater than the second threshold, and installing each of the first group of the plurality of security devices in place of a corresponding one of each of the second group of the plurality of security devices at the respective locations within the secured area of each of the second group of the plurality of security devices.

10. The system as in claim 9 wherein the plurality of security devices includes one or more of a door opener, a magnetic lock, a status input device, a camera, a passive infrared detector, a vibration sensor, and a digital video recorder.

11. The system as in claim 9 wherein one of the plurality of security devices includes an opener for a door, and wherein the respective performance parameters of the opener for the door include an opening time and a closing time of the door.

12. The system as in claim 11 wherein recommendations include a service recommendation that the door be serviced immediately.

13. The system as in claim 12 wherein the one or more criteria include a technical specification of the opener for the door.

14. The system as in claim 9 wherein the respective performance parameters of each of the plurality of security devices include a respective environmental parameter of each of the respective one of the plurality of security devices.

15. The system as in claim 14 wherein the respective environmental parameter of each of the plurality of security devices includes temperature.

16. The system as in claim 15 wherein the one or more criteria include one or more temperature limits, and wherein notice includes, a message suggesting an addition of insulation to a first of the plurality of security devices to avoid operation of the first of the plurality of security devices outside of the one or more temperature limits.

17. A system comprising:
a plurality of sensor devices located within a secured area;
a first actuator that controls access to the secured area, the first actuator installed at a first location;
an automation system that monitors the plurality of sensor devices for threats within the secured area and reports the threats to a central monitoring station;
a processor of the first actuator that measures performance parameters of the first actuator and reports the performance parameters to a control panel of the automation system; and
a processor of the control panel that tracks changes in the performance parameters over a period of time against an operating specification of the first actuator to detect a degradation rate of the performance parameters over the period of time, including a measure of wear of the first actuator,
wherein the processor of the control panel forecasts a potential failure of the first actuator based on the degradation rate, determines a need for corrective action to prevent the potential failure, and presents a notice regarding the potential failure,
wherein the processor of the control panel identifies a second actuator, the second actuator installed at a second location remote from the first location, and
wherein, the processor of the control panel determines the need for the corrective action to prevent the potential failure of the first actuator by at least determining that the wear of the first actuator exceeds a first threshold, the processor of the control panel suggests, in the notice, installing the second actuator in place of the first actuator at the first location when the wear of the second actuator is below a second threshold, wherein the first threshold is greater than the second threshold, and suggests installing the first actuator in place of the second actuator device at the second location.

18. The system as in claim 17 further comprising a sensor that detects an environmental parameter of one of the plurality of sensor devices, wherein the sensor is located external to the secured area.

19. The system as in claim 17 wherein the notice includes highlighting the first actuator on a map.

20. The system as in claim 17 wherein the notice includes highlighting, on a map, the first actuator and the second actuator.

* * * * *